United States Patent
Gupta et al.

(10) Patent No.: US 11,792,566 B2
(45) Date of Patent: Oct. 17, 2023

(54) DIRECTIONAL MICROPHONE AND SYSTEM AND METHOD FOR CAPTURING AND PROCESSING SOUND

(71) Applicants: Soundskrit Inc., Montreal (CA); The Research Foundation for The State University of New York, Albany, NY (US)

(72) Inventors: Sahil Kumar Gupta, Montreal (CA); Stephane Leahy, Montreal (CA); Iman Moazzen, Montreal (CA); Ronald Miles, Newark Valley, NY (US); Jian Zhou, Xiacun (CN)

(73) Assignees: Soundskrit Inc., Montreal (CA); The Research Foundation for The State University of New York, New York, NY (US)

( * ) Notice: Subject to any disclaimer, the term of this patent is extended or adjusted under 35 U.S.C. 154(b) by 0 days.

(21) Appl. No.: 16/960,673

(22) PCT Filed: Jan. 4, 2019

(86) PCT No.: PCT/CA2019/050010
§ 371 (c)(1),
(2) Date: Jul. 8, 2020

(87) PCT Pub. No.: WO2019/134044
PCT Pub. Date: Jul. 11, 2019

(65) Prior Publication Data
US 2020/0336826 A1    Oct. 22, 2020

Related U.S. Application Data

(60) Provisional application No. 62/614,803, filed on Jan. 8, 2018.

(51) Int. Cl.
*H04R 1/40* (2006.01)
*H04R 17/02* (2006.01)
(Continued)

(52) U.S. Cl.
CPC ............ H04R 1/406 (2013.01); H04R 17/02 (2013.01); *B06B 1/0292* (2013.01);
(Continued)

(58) Field of Classification Search
CPC .... H04R 17/005; H04R 17/025; H04R 1/406; H04R 17/02; H04R 2201/401;
(Continued)

(56) References Cited

U.S. PATENT DOCUMENTS 11,006,219 B2 * 5/2021 Miles .................... H04R 29/004
2001/0008559 A1 * 7/2001 Roo ....................... H04R 3/005
                                                              381/91

(Continued)

FOREIGN PATENT DOCUMENTS

JP          S5390919 A   *   8/1978

OTHER PUBLICATIONS

Wang et al, Piezoelectric Nanowires in Energy Haversting Application (Year: 2015).*

(Continued)

*Primary Examiner* — Carolyn R Edwards
*Assistant Examiner* — Kuassi A Ganmavo
(74) *Attorney, Agent, or Firm* — Lempia Summerfield Katz LLC

(57) ABSTRACT

Microphones, microphone systems, and methods for capturing and processing sound are described. The microphones and microphone systems may adaptively change the direction from which sound is captured. The microphones and microphone systems avoid the need to provide arrays of microphones, while providing adaptive beamforming with- (Continued)

out a time delay between each channel of information, and multi-directional sound capture. A dependency between the frequency response and system size is also avoided.

23 Claims, 8 Drawing Sheets

(51) Int. Cl.
    *G01N 29/34*     (2006.01)
    *G01N 29/24*     (2006.01)
    *H04R 17/00*     (2006.01)
    *H04R 1/44*     (2006.01)
    *B06B 1/02*     (2006.01)

(52) U.S. Cl.
    CPC ......... *G01N 29/2425* (2013.01); *G01N 29/34* (2013.01); *G01N 2291/021* (2013.01); *H04R 1/44* (2013.01); *H04R 17/005* (2013.01); *H04R 17/025* (2013.01); *H04R 2201/401* (2013.01); *H04R 2430/20* (2013.01)

(58) Field of Classification Search
    CPC ....... H04R 2430/20; H04R 1/44; H01L 41/00; H01L 41/314; B06B 1/0292; G01N 29/2425; G01N 29/34; G01N 2291/021
    See application file for complete search history.

(56) References Cited

U.S. PATENT DOCUMENTS

| | | | |
|---|---|---|---|
| 2007/0253570 A1* | 11/2007 | Fukumoto | H04R 1/083 381/71.12 |
| 2011/0261980 A1* | 10/2011 | Akino | H04R 9/048 381/176 |
| 2012/0230498 A1* | 9/2012 | Shimura | H04R 5/027 381/26 |
| 2012/0288101 A1* | 11/2012 | Okita | H04R 5/027 381/26 |
| 2013/0051587 A1* | 2/2013 | Stephanou | H04R 23/02 29/25.35 |
| 2013/0343571 A1* | 12/2013 | Rayala | H04R 3/005 381/92 |
| 2014/0247954 A1* | 9/2014 | Hall | H04R 23/006 381/92 |
| 2015/0215707 A1* | 7/2015 | West | H04R 17/025 381/173 |
| 2020/0162821 A1* | 5/2020 | Miles | H04R 9/08 |

OTHER PUBLICATIONS

Hillenbrand et al, High Sensitivity piezoelectric microphones based on stacked cellular polymer films (Year: 2004).*
Lang et al, High Sensitivity acoustic sensors from nanofibre webs (Year: 2015).*
Hu, Directional Speech Acquisition using MEMS Cubic acoustical sensor microarray (Year: 2006).*
International Search Report and Written Opinion from International Patent Application No. PCT/CA2019/050010, dated Apr. 4, 2019, 7 pages.
Jian Zhou et al., "Sensing Fluctuating Airflow with Spider Silk", PNAS, Nov. 2017, 6 pages, vol. 114, No. 46.
R.N. Miles et al., "Sound-Induced Motion of a Nano-Scale Fiber", Journal of Vibration and Acoustics, VIB-16-1354, Sep. 22, 2017, 17 pages.

* cited by examiner

DIRECTIONAL MICROPHONE AND SYSTEM AND METHOD FOR CAPTURING AND PROCESSING SOUND

CROSS-REFERENCE TO RELATED APPLICATION(S)

This U.S. national phase application is based on is based on International Application No. PCT/CA2019/050010, filed on Jan. 4, 2019, which claimed the benefit of priority to U.S. Provisional Patent Application No. 62/614,803 filed on Jan. 8, 2018, the entire disclosures of which are incorporated herein by reference.

TECHNICAL FIELD

The following relates to a directional microphone and microphone system, and additionally to methods for capturing and processing sound and applications for same.

BACKGROUND

Significant efforts have been made to develop directional microphones that capture sounds from one direction, while ignoring sounds coming from other directions. Currently, the most common type of directional microphone is the ribbon microphone, which uses a thin ribbon to respond only to the component of a sound wave that is perpendicular to either face of the ribbon [1].

While the ribbon microphone has seen significant success at larger scales, it has not been known to be successfully miniaturized. Many attempts have been made to make small directional microphones [2, 3, 4], exploiting cost-effective MEMS manufacturing processes. Much of the MEMS directional microphone work has focused on using membranes that respond to the pressure gradient of an acoustic wave. Several designs are based on research on the parasitoid fly *Ormia Ochracea* [5]. More recently, work has been published on a method of sensing the particle velocity of sound instead of its pressure gradient using nanofibers made from spider silk [6].

While directional microphones exist, most of them are designed to capture sound only along a single, fixed axis of incoming sound. Therefore, they are considered to provide limited benefits in applications where it desired to capture sounds coming from multiple directions, or to capture sounds from a moving sound source.

To overcome this, differential microphone arrays can be combined with signal processing for beamforming [7]. In this way, a microphone's direction of sound capture can be "steered" to a desired location. This requires the array of microphones to have sufficient physical spacing between each microphone so that each microphone is exposed to a different pressure of the sound wave. Information based on the difference in pressure, or the pressure gradient, of the sound wave is used to create this steerable beam, which adds a dependency on the frequency.

As the wavelength of sound increases, the difference in pressure between multiple microphones decreases, and thus the sensitivity of the system decreases [8]. This is a constraint to which all microphone arrays are subject. The closer the microphones are brought to one another, the greater the sensitivity drops at lower frequency. If the microphones are spaced too far apart, then the array does not capture high frequency signals effectively. Therefore, the microphone array is known to be subject to constraints on the frequencies it can capture based on the size of the array. In other words, in order to create a microphone solution that can adaptively choose which direction to listen to, the sensitivity and size would need to be compromised.

Another example of beamforming is delay-and-sum beamforming. Rather than use differential microphone arrays, multiple spatially-separated pressure based microphones are summed together with specified time delays for each microphone signal. In this method of beamforming, it is well known that the directionality (or polar) pattern changes as a function of frequency. In this approach, if the microphones are brought close to one another, the directional performance has been found to suffer significantly at low frequencies—the array becomes omnidirectional—and if the microphones are spaced far apart, the directional performance at high frequencies is compromised. That is, there is a tradeoff between size and performance.

It is an object of the following to address at least one of the aforementioned drawbacks or disadvantages.

SUMMARY

The following provides a microphone and microphone system, and additionally to methods for capturing and processing sound that can be adapted to provide a small directional microphone. The following provides a single microphone solution that can adaptively change which direction it captures. A system is provided that avoids the need to provide arrays of microphones and enables adaptive beamforming without a time delay between each channel of information, enables multi-directional sound capture, and avoids a dependency between the frequency response and system size.

In one aspect there is provided a directional microphone comprising a plurality of layers, each layer comprising a single sensing element or an array of sensing elements being oriented perpendicular to a desired direction of sensitivity, wherein the layers are separated from each other to allow free movement of the sensing elements.

In another aspect, there is provided a sensor system comprising: a frame; a printed circuit board supported in the frame; a first magnet supported in the frame above the printed circuit board; a second magnet supported in the frame below the printed circuit board; and a directional microphone per the above, supported in the printed circuit board between the first and second magnets.

BRIEF DESCRIPTION OF THE DRAWINGS

Embodiments will now be described with reference to the appended drawings wherein.

DETAILED DESCRIPTION

Figure 1:
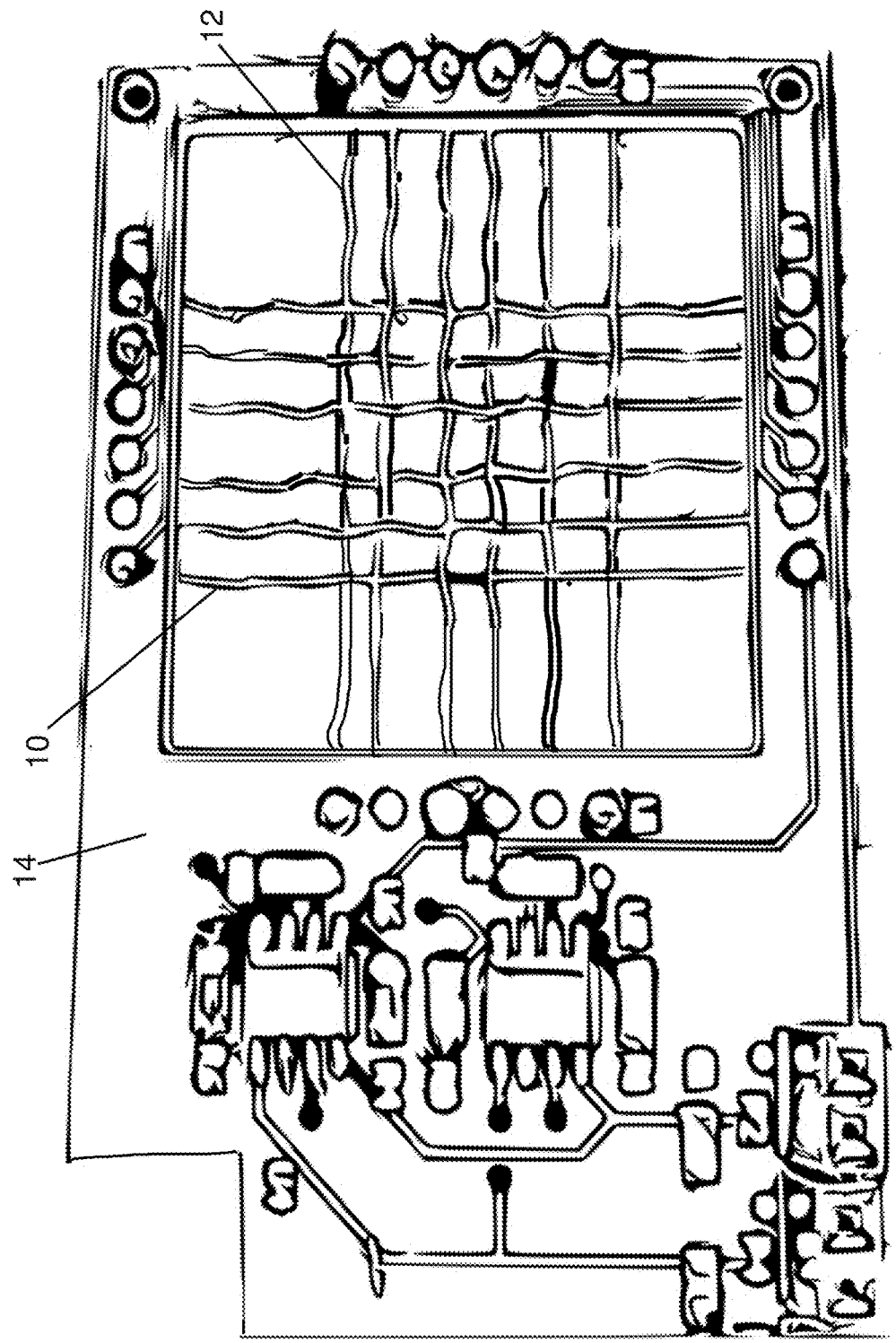
FIG. 1 is a plan view of a printed circuit board (PCB) with a multi-layer microphone.

The proposed system provides various advantages and improvements relative to the related technologies.

Collocated multi-directionality—Existing multi-directional systems require the use of arrays of microphones with a physical spacing between each microphone corresponding to the desired wavelength of sound capture. In the proposed solution, layers of bi-directional fibers are stacked on top of each other with physical spacing corresponding to the fiber diameter. This enables the overall system size to be small and provides channels of information corresponding to each direction with nearly zero-time delay between each other.

Small form factor—The array of fibers for each layer is in plane with the sound wave to make the system thin. Each fiber in the array can be connected in series to maximize sensitivity in the confined geometry.

Modularity—Stacking more bi-directional layers on top of each other in different angular orientations provides additional directions of sensitivity.

Single microphone dynamic beamforming—Because a single microphone is sensitive to multiple directions, weights can be added to each individual direction to dynamically steer the direction that the microphone is most sensitive to. Because there is no time delay between channels of information (each corresponding to a specific direction) the directional solution works across the whole audible range of frequencies without loss in sensitivity.

Low computational complexity—Because the proposed solution does not rely on the time-delay beamforming principle and are inherently directional, complex or time-consuming signal processing are not required to get a direction. To adaptively provide beamforming, the system can use a simple weighted sum of the microphone outputs and thus have a relatively simple and fast solution for beamforming in real-time.

The system described herein is a continuation of the work published by Professor Ron Miles in Ref. [6] and as described in PCT Patent Application No. PCT/US2017/065637 ("Fiber Microphone"), filed on Dec. 11, 2017, and now published as WO 2018/107171, claiming the benefit of priority from U.S. Provisional Patent Application No. 62/432,046 filed on Dec. 9, 2016, the contents of which are incorporated herein by reference. In this previous work, there is described a fiber of a mass and stiffness low enough to move exactly with the flow of a surrounding fluid medium, in this case air. An electrical signal corresponding to the particle velocity of the air flow is output by electromagnetic induction. The fiber is conductive (e.g., stainless steel) and placed within a magnetic field such that movement of the fibers induces a voltage. An array of these fibers is used and connected in series to increase the sensitivity of the microphone and create a "1D microphone" that outputs an electrical signal based on sounds only coming in a single direction.

In the presently described system, the fiber-based microphone is expanded to develop multi-directional microphones that can capture sound coming from different directions. As described below, this is done by using multiple layers oriented in different directions. While the existing concept demonstrated in [6] senses sound waves oriented perpendicular to the plane of an array of fibers, the presently described system is oriented to capture sound waves arriving parallel to the plane of the array of fibers, but perpendicular to each individual fiber. This allows one to stack multiple layers very close to one another, thus creating a single collocated sensor that is multi directional. An example of this is shown in FIG. 1.

Figure 2:
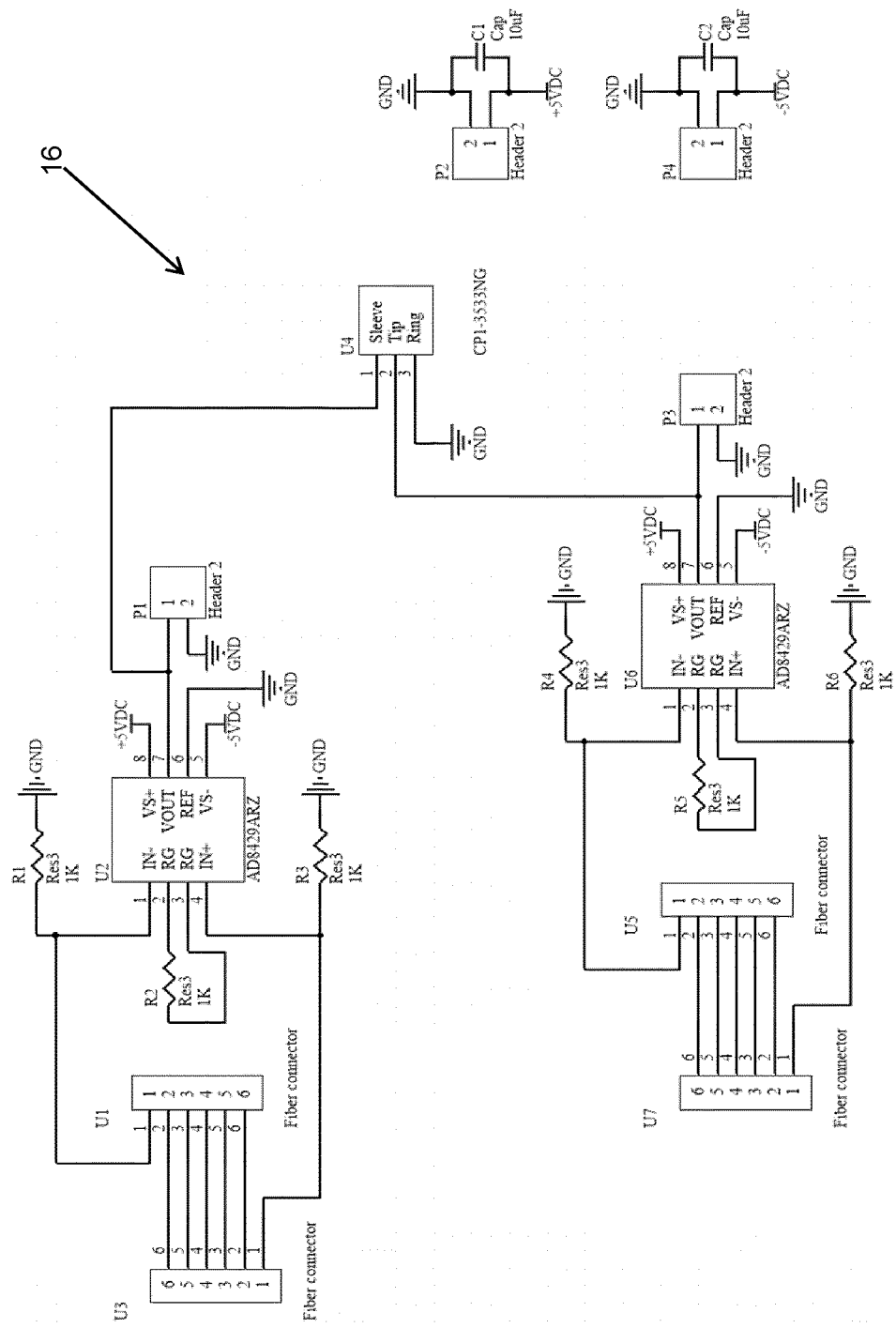
FIG. 2 is a circuit schematic for a two-layer microphone.
Figure 3:
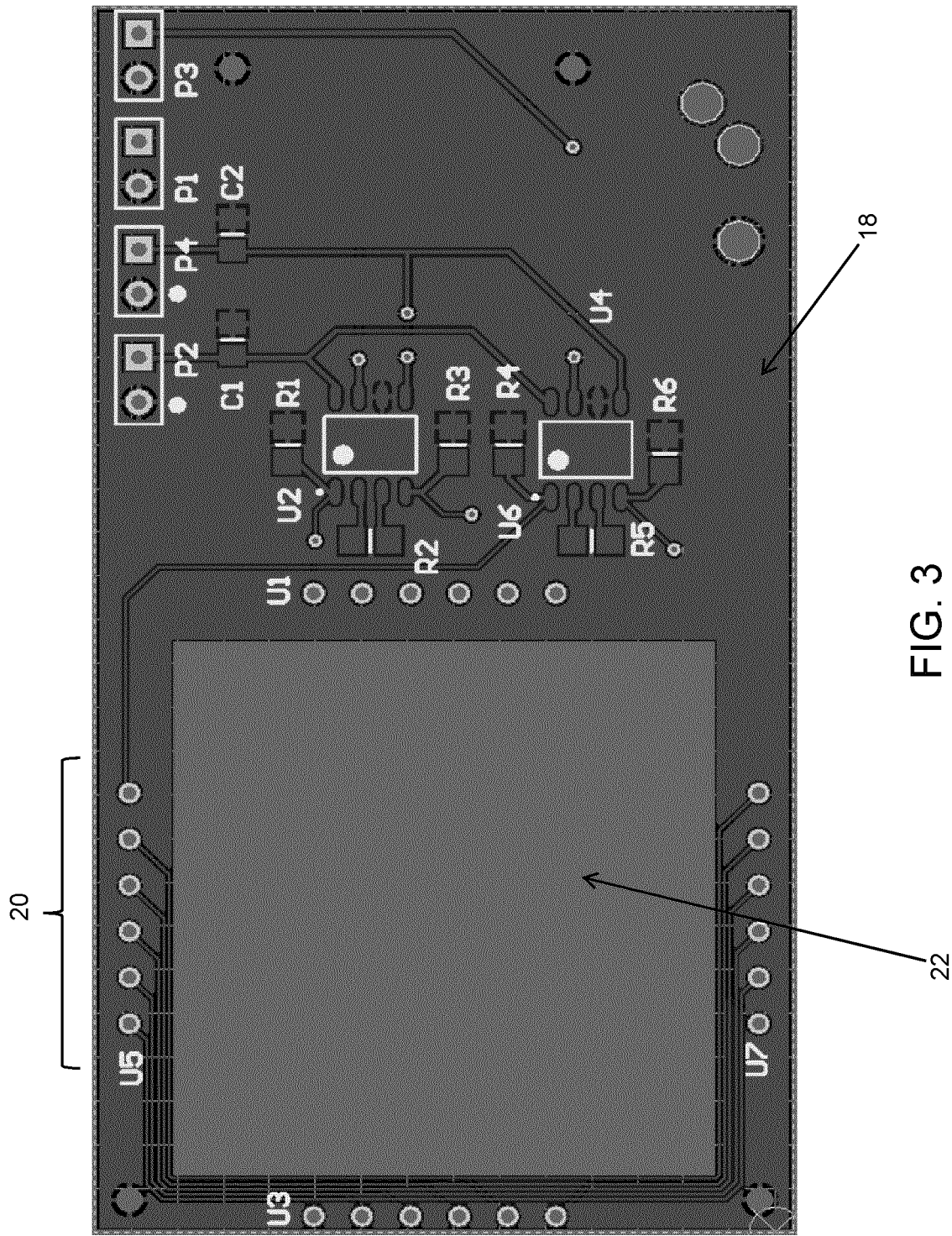
FIG. 3 is a PCB layout for the two-layer microphone.

Turning now to the figures, in FIG. 1 an array of stainless steel fibers is oriented both vertically 10 and horizontally 12, and orthogonal to one another. The vertical fibers 10 sit on top of a PCB 14 while the horizontal fibers 12 sit just under the PCB 14. As a result, the two layers of fibers have enough space in between them so that they are free to move with incoming air flow without colliding with the other layer. Each layer of fibers has an associated amplifier circuit to read out an electrical signal corresponding to the average velocity of each layer of fibers. Thus, the output of this manifestation of the presently described system has two channels corresponding to each of the two layers. A schematic of the circuitry 16 and a PCB layout 18 are shown in FIG. 2 and FIG. 3 respectively.

Figure 4:
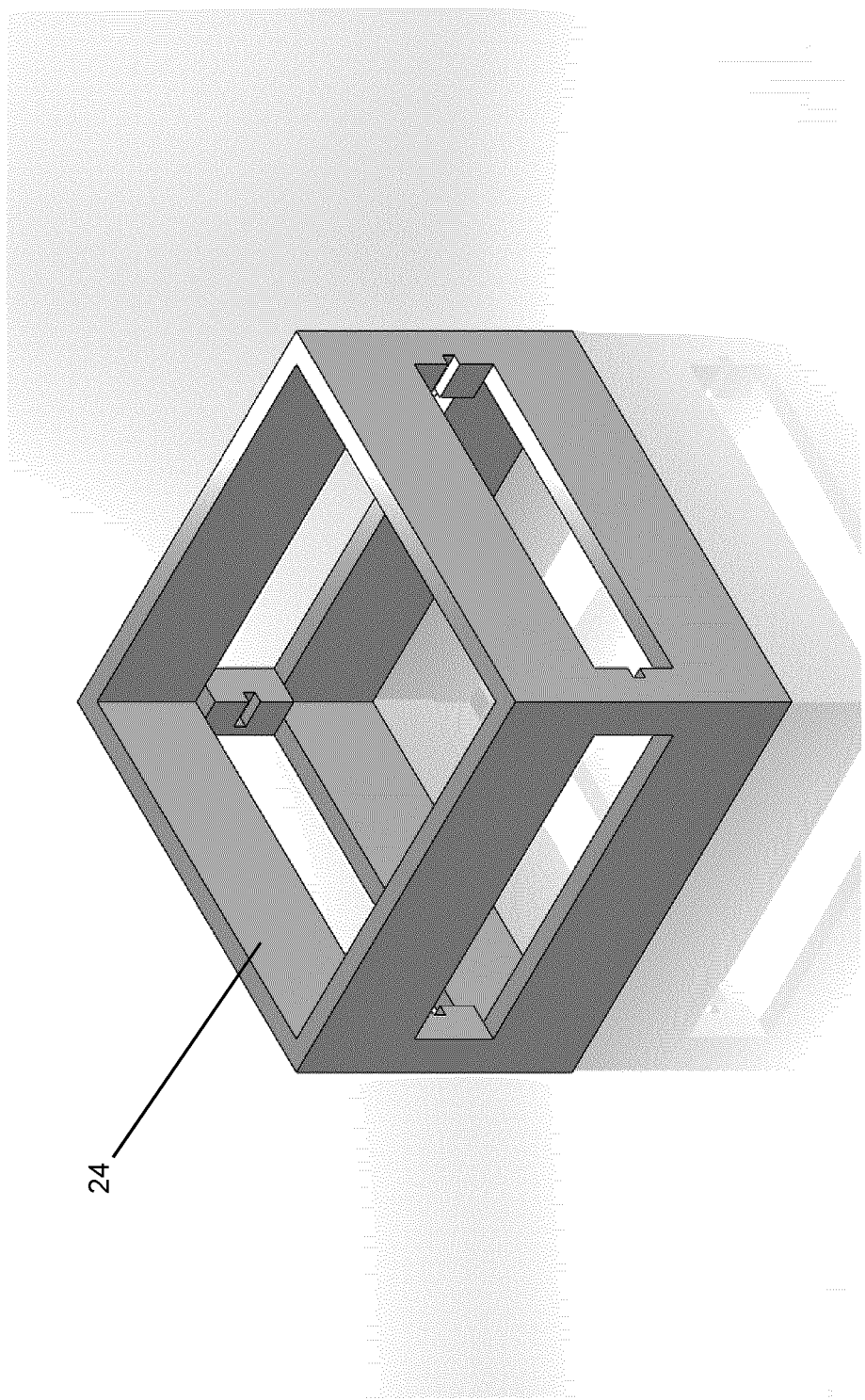
FIG. 4 is a perspective view of a magnetic housing for a two-layer microphone.

The holes 20 in the PCB 18 shown in FIG. 3, labeled U1, U3, U5, and U7 can be used to solder each end of the suspended fibers 10, 12 above and below the rectangular hole in the PCB. Traces are made along the rectangular gap of the PCB 18 to attach the fibers 10, 12 in each layer electrically in series. The resulting microphone 22, can be placed in a frame 24 (e.g., plastic 3D printed frame) between two magnets 26 (e.g., made from Neodymium). A schematic drawing of the housing 24 used to hold the microphone is shown in FIG. 4, and a photograph of the setup, illustrating the magnets 26, is shown in FIG. 5.

Figure 5:
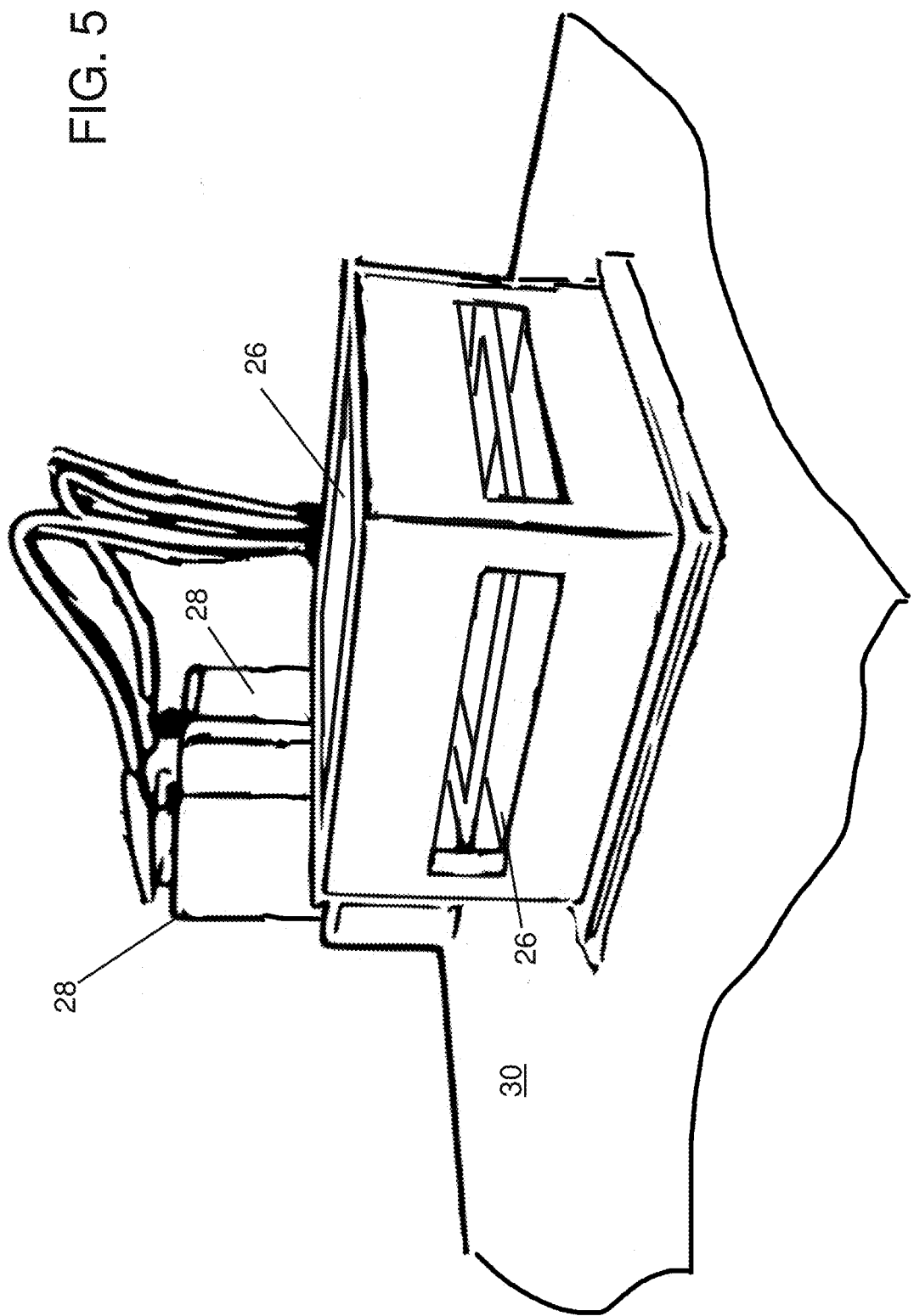
FIG. 5 is a perspective view of an experimental setup for the magnetic housing depicted in FIG. 4.

The microphone 22 embodiment shown in FIG. 5 is powered by two 9-volt batteries 28 and placed on a grounding plane 30 to reduce noise. One channel of the microphone measures sound flow along port "A" and the other channel measures sound flow along port "B", corresponding to the movement of a specific layer of fibers 10, 12. Sound arriving in the direction of the opening labeled A moves the vertically oriented fibers 10 while sound arriving in the direction of opening B moves the horizontally oriented fibers 12. By attaching weights to each channel and summing the two outputs, one can effectively steer the beam pattern of the microphone 22 towards any direction in-plane with the microphone 22.

It can be appreciated that this principle can be extended by adding additional layers to the microphone to add more channels and add sensitivity to additional directions. A schematic drawing of this is shown in FIGS. 6 and 7.

Figure 6:
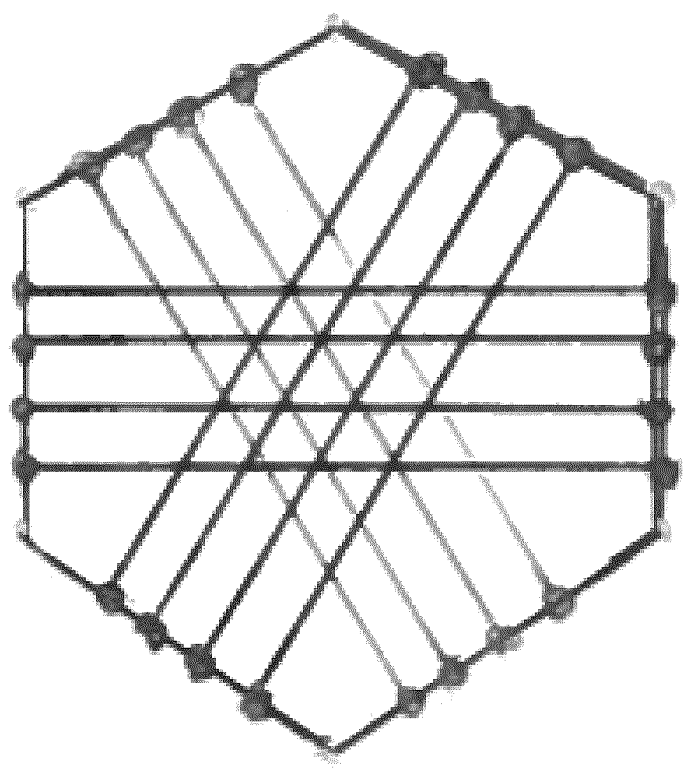
FIG. 6 is a schematic plan view of a multi-layer microphone comprising more than two layers.
Figure 7:
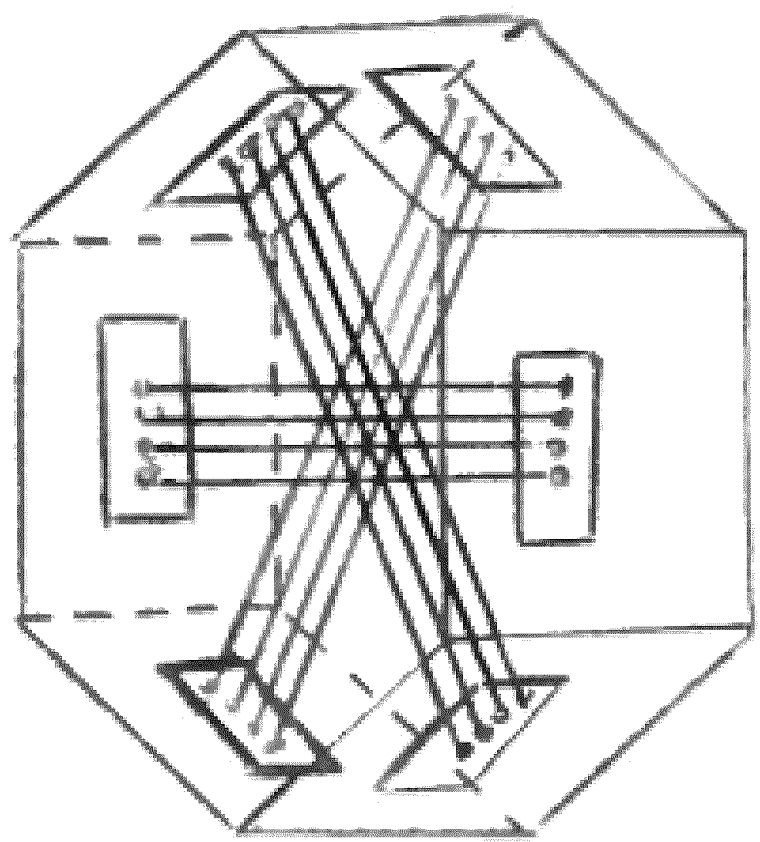
FIG. 7 is a schematic perspective view of the multi-layer microphone of FIG. 6.
Figure 8:
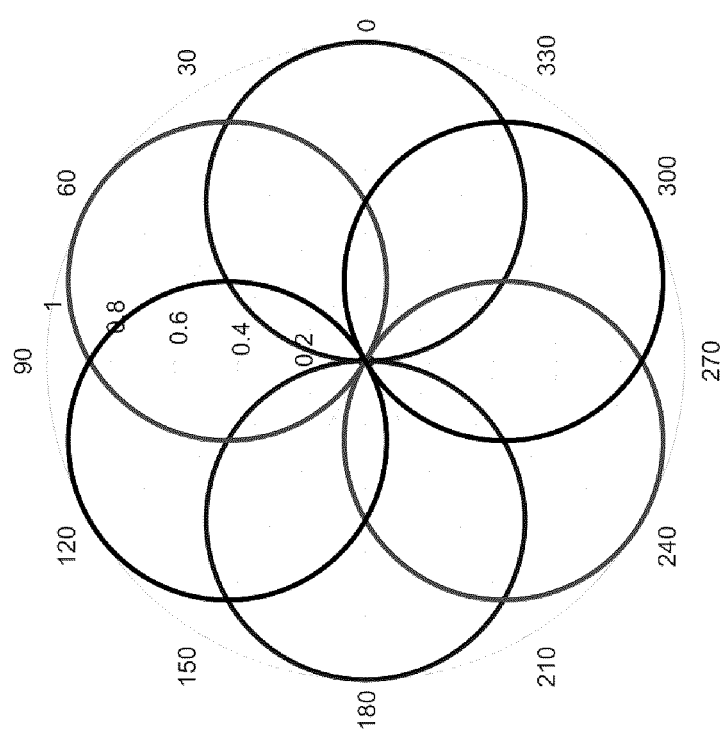
FIG. 8 is a polar pattern diagram for a three-layer microphone.

As shown in FIGS. 6 and 7, additional directions of sensitivity can be incorporated into a single microphone package by adding another layer of fibers oriented perpendicular to the desired direction of sensitivity. The microphone illustrated in FIGS. 6 and 7 is sensitive to 3 different directions; however, this principle can be readily extended to even more directions. Because each layer (corresponding to sensitivity of the microphone to a specific direction) is composed of an array of thin nanofibers oriented in the same plane as the direction of incoming sound waves, an additional layer of sensitivity for each desired direction can be added without adding a significant amount of thickness to the overall microphone. This is advantageous because this provides the potential to build a single, multi-directional microphone 22 on a single chip once scaled down in size. The corresponding beam patterns for the microphone 22 shown in FIGS. 6 and 7 is illustrated in FIG. 8.

The collocated multi-directional acoustic sensor provides a new set of abilities in signal processing and beamforming applications. Current methods of beamforming rely on a time delay principle wherein multiple microphones are in separate locations spatially (antenna). However, introducing time delay to the system comes at the cost of having the frequency-dependent weights for beamforming. It is also well known that to avoid the performance degradation at low frequencies, the antenna should be very long where each sensor is connected to a long-tapped delay line (TDL) [7]. In other words, to appropriately process typical signals in a microphone array, a large amount of weights is needed for each microphone in the system corresponding to different frequencies. This structure is not considered to be feasible in space-constrained applications such as hearing aid devices and are computationally expensive.

Such poor performance at low frequencies can be particularly problematic for broadband signals such as voice where bass and low frequencies are dominant. By maintaining a single collocated structure, not only can the presently described solution save significant space, beamforming can be achieved without a time delay in the data. Because the response of the proposed solution is frequency independent (without time delay), each output channel only needs a single weight associated with it for further processing, rather than a different weight for each frequency in the desired spectrum. This eliminates the need for TDL and consequently significantly decreases the computational load. Thus the use of a collocated microphone architecture as proposed in this disclosure creates a possibility for faster, real-time processing in a variety of desirable applications such as echo cancellation, beamforming and source separation.

The above-described principles can be modified in several ways. First, the whole device could be scaled down into a smaller package (or scaled up into a larger package). Scaling down can be done using various manufacturing methods for creating high precision structures with small feature sizes such as MEMS fabrication, electrospinning, or other nanofiber fabrication techniques. This allows for the use of thinner fibers within closer spacing to allow the packing of an increased number of fibers in series in the same area. Additional layers could be added into the structure while maintaining the same effective area and adding minimal thickness to the device (on the order of 1 micron).

Moreover, the fibers themselves used to create each layer of the microphone do not need to be perfectly cylindrical. While nanofibers have been used in the present solution, other geometries can be used as long as the sensing element is of low enough mass and stiffness that it accurately samples the motion of enough molecules of the surrounding medium. An example of an alternative sensing element to a nanofiber can be a very thin sheet (e.g., 100 nm thick and 2 microns wide). Arrays of thin sheets electrically connected in series could be used to compose each layer of the microphone. The use of thin sheets may make fabrication with MEMS easier, as well as allow multiple layers to be stacked even closer to one another.

While the current method of sensing each layer of fibers uses electromagnetic induction, each fiber could be made of a material that generates a voltage upon stress (i.e. piezoelectric) or changes in resistivity (i.e. piezo resistive or magnetoresistive) to produce an electrical output corresponding to motion of the fiber. Additionally, optical sensing could enable multi-directional sound sensing with fewer layers of fibers. For example, two lasers pointed perpendicularly could be used to measure the vibration of a single fiber in two directions. Three lasers and two fibers would provide 3D sound capture.

Because the current methodology generates a small amount of power due to an external sound field, a microphone can be constructed that turns on a circuit or switch, dependent on the direction of incoming sound. The thickness, tension, and mass of the fibers can be used to tune the resonance frequency of the system if it is desired to "wake up" or close a switch for a specific desired frequency of excitation.

While the beamforming is carried out in software, an analog equivalent circuit can be created to steer the beam as well. This would create a "smart microphone" that can dynamically steer a beam without needing a computationally intensive processor or "brain". The microphone itself could be made standalone and used as a recording device or one for control.

The principles and systems described herein can be applied in many areas and applications that involve spatial sound capture. An advantage this device brings over other alternatives is that it can separate sounds coming from multiple directions (or track moving sound objects) all in a single package without using large arrays. Additionally, because it avoids the use of multiple microphones separated spatially, it maintains high quality audio. Some of the specific applications include, but are not limited to:

1. Studio microphones—this technology has apparent applications to work as traditional studio microphones. With this, bands or multiple speakers can be recorded with a single microphone if standing in discrete locations.

2. Smartphones—new functionality for smartphones including "audio zooming" similar to how a camera zoom works. The smart phones can also be aware where sound is coming from and only turn on from voice directly in front of it (as opposed to unrelated noise in the environment).

3. Smart home devices (voice assistant, smart speakers, smart TV, etc.)—smart home devices requiring far field speech recognition.

4. Teleconferencing—a dynamically steerable microphone that steers to whoever is speaking, while blocking out surrounding noise.

5. Drones/UAVs—sensors for detecting gunshots/artillery, for collision avoidance, or speed measurements (air flow).

6. AR/VR—new ambisonic type microphones for 360 sound capture and AR devices that let you choose what sounds in the environment to listen to and which to mute 7. Security—microphone that tell you where sound along a perimeter is coming from, or turns on a security system once sound or movement is heard.

8. Wearables—microphones to give wearables voice capability without having to bring wearable device right next to the user's mouth.

9. Hearing Aids/Hearables—vast improvement on directional hearing aids and hearables that can selectively choose which sounds to listen in on.

10. Laptops/Tablets—microphones that only pick up sound coming from the user in front of it for applications like Skype, WebEx, etc.

11. Automotive—microphones that improve hands free Bluetooth and speech recognition in automotive vehicles by drowning out noise from the road.

12. Noise emission testing/machine monitoring—microphones used to pinpoint where noise is coming from in a piece of machinery for designing quieter engines or performing predictive health monitoring.

13. Traffic monitoring—sound sensors can be used to count the amount of vehicular or pedestrian traffic in a desired area, or listen to the general noise energy coming from various directions.

14. Smart cities—sound sensors distributed across a city to give an additional layer of information for analytics.

15. Pipe Monitoring—microphones that can listen in to pipelines (water, gas, etc.) to detect the presence of leaks.

16. Noise Cancelling—these sensors can be integrated into various consumer electronics (smartphones, headphones, etc.) and used to cancel noise coming from a specific direction.

17. Weather Monitoring—it can be used as a flow sensor distributed in various locations across a large area to map the direction of wind flow. Because the fibers are very sensitive to low frequency, it can also be used to sense infrasound.

Tracking—because the sensors are very sensitive to low frequencies, they can be used to track moving objects that have an infrasound emitter on them; this can be used for indoor localization in small radiuses without generating audible noise.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the PCB 14, any component of or related to the PCB 14, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] W. Julius and H. F. Olson. Sound pick-up device, Dec. 27, 1932. U.S. Pat. No. 1,892,645.

[2] R. N. Miles, Q. Su, W. Cui, M. Shetye, F. L. Degertekin, B. Bicen, C. Garcia, S. Jones, and N. Hall. A low-noise differential microphone inspired by the ears of the parasitoid fly *Ormia ochracea*. Journal of the Acoustical Society of America, 125(4, Part 1): 2013-2026, April 2009.

[3] Miles, R. N., Cui, W., Su, Q. T., & Homentcovschi, D. (2015). A MEMS low-noise sound pressure gradient microphone with capacitive sensing. *Journal of Microelectromechanical Systems*, 24(1), 241-248.

[4] A. Reid, J. F. C. Windmill, and D. Uttamchandani. Bio-inspired Sound Localization Sensor with High Directional Sensitivity. Procedia Engineering, 120: 289-293, September 2015.

[5] R, Miles, D. Robert, and R. Hoy. Mechanically coupled ears for directional hearing in the parasitoid fly *Ormia ochracea*. The Journal of the Acoustical Society of America, 98(6): 3059-3070, 1995.

[6] Zhou, Jian, and Ronald. N, Miles. "Sensing fluctuating airflow with spider silk." Proceedings of the National Academy of Sciences (2017): 201710559, and SI www.pnas.org/cgi/content/short/1710559114.

[7] Harry L. Van Trees, Optimum Array Processing: Part IV of Detection, Estimation, and Modulation Theory, Wiley, 2002

[8] Iman Moazzen and Pan Agathoklis, "Efficient Implementation of Broadband Beamformers Using Nested Hexagonal Arrays and Frustum Filters," in *IEEE Transactions on Signal Processing*, vol. 61, no. 19, pp. 4796-4805, Oct. 1, 2013.

The invention claimed is:

1. A directional microphone comprising a plurality of layers, each layer comprising an array of fibers oriented in a respective plane, the fibers of each array of fibers being oriented perpendicular to a respective direction of sensitivity, wherein respective layers among the plurality of layers are spaced from each other to allow free movement of the fibers, and wherein the plurality of layers includes at least a first layer stacked in parallel with a second layer, wherein the first layer comprises fibers oriented in a first direction and the second layer comprises fibers oriented in a second direction different than the first direction such that i) the fibers of the first layer are oriented at an angle with respect to the fibers of the second layer and ii) the respective direction of sensitivity of the first layer is at the angle with respect to the respective direction of sensitivity of the second layer.

2. The directional microphone of claim 1, wherein the fibers of of the plurality of layers are cylindrical.

3. The directional microphone of claim 1, wherein each fiber of the array of fibers of each layer of the plurality of layers comprises a nanofiber.

4. The directional microphone of claim 1, wherein each fiber of the array of fibers of each layer of the plurality of layers is piezoresistive.

5. The directional microphone of claim 1, wherein each fiber of the array of fibers of each layer of the plurality of layers is piezoelectric.

6. The directional microphone of claim 1, wherein each wherein each fiber of the array of fibers of each layer of the plurality of layers is magnetoresistive.

7. The directional microphone of claim 1, wherein each fiber of the array of fibers of each layer of the plurality of layers is configured for optical sensing.

8. The directional microphone of claim 1, wherein the plurality of layers are stacked such that the plurality of layers are collocated and such that signals from the plurality of layers are provided without time delays therebetween.

9. The directional microphone of claim 1, wherein an electrical output of each layer of the plurality of layers is processed to perform signal processing, the electrical outputs having no time delay therebetween.

10. The directional microphone of claim 9, wherein a respective weight is applied to the electrical output of each layer of the plurality of layers such that the signal processing comprises beamforming.

11. The directional microphone of claim 10, wherein the respective weights are frequency independent.

12. The directional microphone of claim 10, wherein the beamforming comprises summing the electrical outputs with the respective weights applied thereto.

13. The directional microphone of claim 1, wherein the plurality of layers are separated such that the free movement of the fibers occurs without collision with a fiber in another layer of the plurality of layers.

14. The directional microphone of claim 1, wherein the fibers in each array of sensing elements are connected in series.

15. The directional microphone of claim 1, wherein the fibers in each array of fibers are connected in parallel.

16. A sensor system comprising:
   a frame;
   a printed circuit board supported in the frame;
   a first magnet supported in the frame above the printed circuit board;
   a second magnet supported in the frame below the printed circuit board; and
   a directional microphone according to claim 1 and supported by the printed circuit board between the first and second magnets.

17. A switch comprising a directional microphone according to claim 1, wherein the directional microphone is constructed to turn on the switch dependent on a direction of incoming sound.

18. A directional microphone comprising:
   a plurality of sensing element layers, each sensing element layer of the plurality of sensing element layers comprising an array of fibers oriented in a respective plane, the plurality of sensing element layers being stacked such that the respective planes are in parallel;
   wherein, for each sensing element layer of the plurality of sensing element layers, each fiber of the array of fibers is oriented perpendicular to a respective direction of sensitivity, and the respective direction of sensitivity lies in the respective plane in which the array of fibers is oriented,
   wherein the plurality of sensing element layers include a first sensing element layer with fibers oriented in a first direction and a second sensing element layer with fibers oriented in a second direction different than the first direction such that i) the fibers of the first sensing element layer are oriented at an angle with respect to the fibers of the second sensing element layer and ii) the respective direction of sensitivity of the first sensing element layer differs from is at the angle with respect to the respective direction of sensitivity of the second sensing element layer.

19. The directional microphone of claim 18, further comprising:
   a first magnet; and
   a second magnet spaced from the first magnet;
   wherein the plurality of sensing element layers are disposed between the first and second magnets.

20. The directional microphone of claim 18, wherein the plurality of sensing element layers are spaced from one another to allow free movement of the fibers.

21. The directional microphone of claim 18, wherein the fibers of the plurality of sensing element layers are cylindrical.

22. A directional microphone comprising:
   a first magnet; and
   a second magnet spaced from the first magnet;
   a plurality of sensing element layers disposed between the first and second magnets, each sensing element layer of the plurality of sensing element layers comprising an array of fibers oriented in a respective plane,
   wherein, for each sensing element layer of the plurality of sensing element layers, each fiber of the array of fibers is oriented perpendicular to a respective direction of sensitivity, and the respective direction of sensitivity lies in the respective plane in which the array of fibers is oriented,
   wherein the plurality of sensing element layers are stacked in parallel with one another,
   wherein the plurality of sensing element layers include a first sensing element layer with fibers oriented in a first direction and a second sensing element layer with fibers oriented in a second direction different than the first direction such that i) the fibers of the first sensing element layer are oriented at an angle with respect to the fibers of the second sensing element layer and ii) the respective direction of sensitivity of the first sensing element layer differs from is at the angle with respect to the respective direction of sensitivity of the second sensing element layer.

23. The directional microphone of claim 22, wherein:
   the fibers of each sensing element layer are cylindrical.

* * * * *